Nov. 1, 1932.  J. M. MALLETTE  1,885,274
AUTOMOBILE SIGNAL
Filed March 30, 1932   3 Sheets-Sheet 1

Inventor
J. M. Mallette

By Clarence A. O'Brien
Attorney

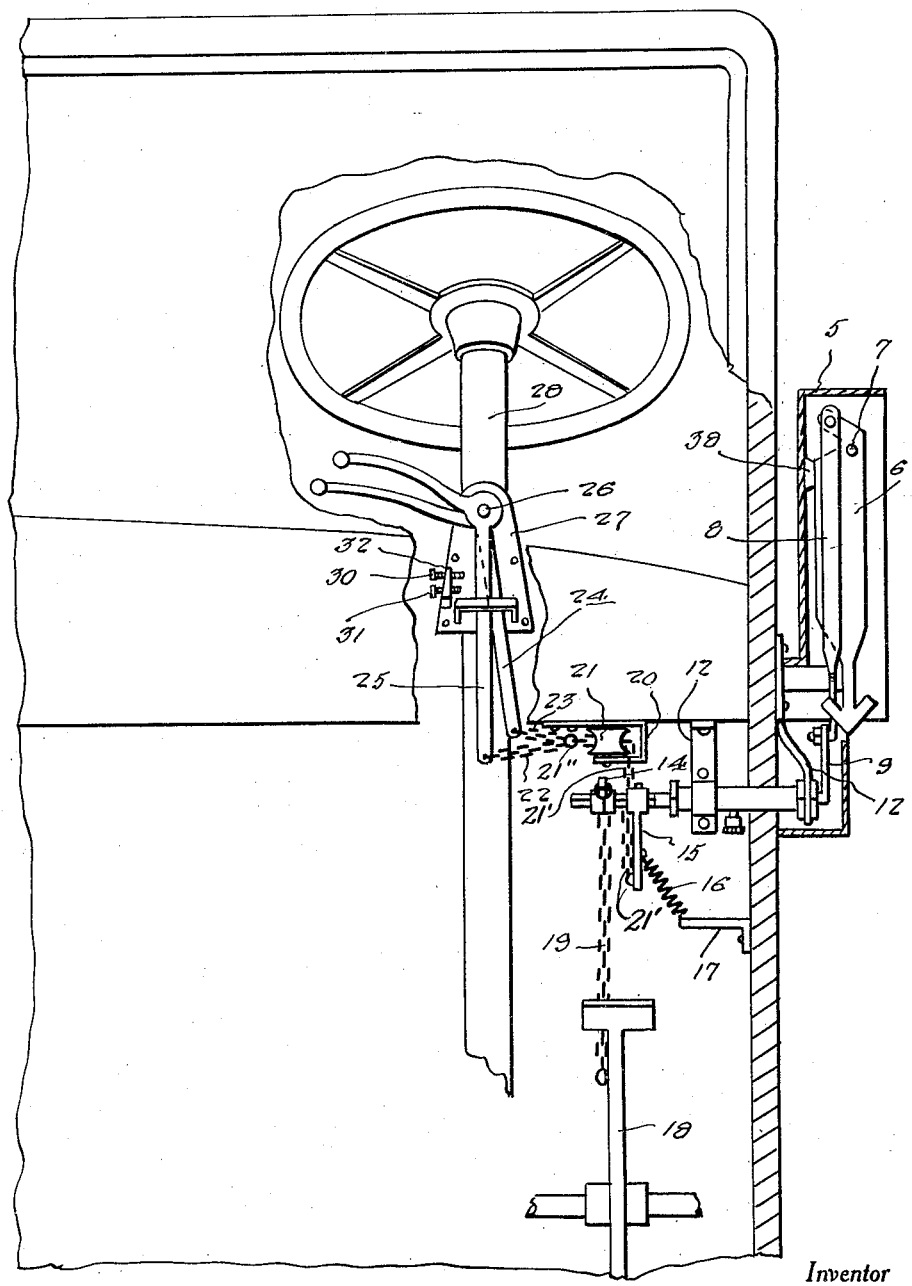

Nov. 1, 1932.  J. M. MALLETTE  1,885,274
AUTOMOBILE SIGNAL
Filed March 30, 1932   3 Sheets-Sheet 3
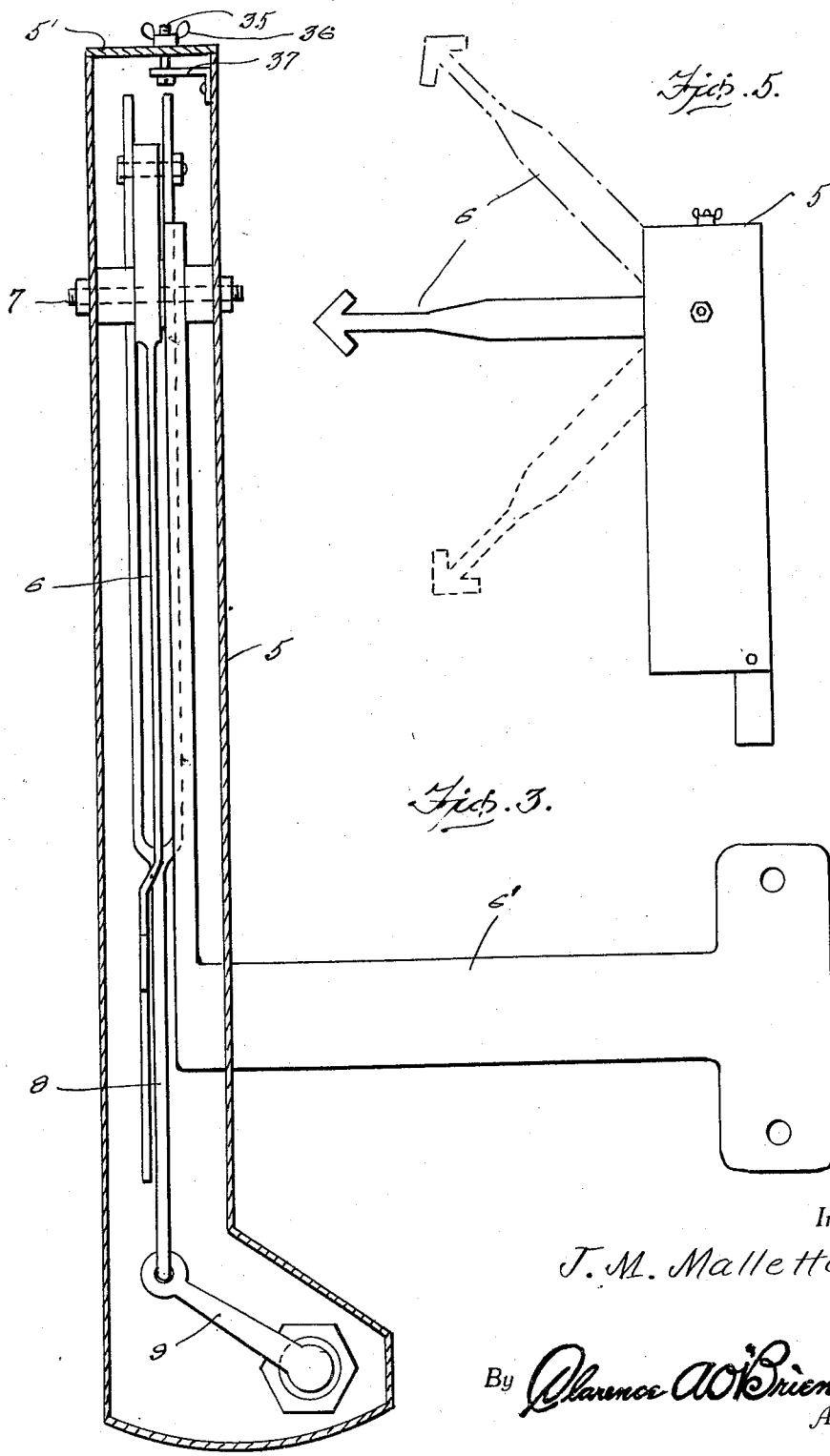
Inventor
J. M. Mallette
By Clarence A. O'Brien
Attorney Patented Nov. 1, 1932

1,885,274

UNITED STATES PATENT OFFICE

JOSEPH M. MALLETTE, OF NEW LONDON, CONNECTICUT

AUTOMOBILE SIGNAL

Application filed March 30, 1932. Serial No. 602,040.

The present invention relates to a signal for automobiles and the like whereby the driver may conveniently use signals as to his intention to make a right or left hand turn or to slow down.

The objects of the invention are to provide a signal of this nature which is simple in construction, easy to manipulate, efficient and reliable in use and operation, and otherwise well adapted to the purpose for which it is designed.

With the above and numerous other objects as will appear as the description proceeds, the invention resides in certain novel features of construction and in the combination and arrangement of parts as will be hereinafter more fully described and claimed.

In the drawings:

Figure 2 is a sectional view taken substantially on the line 2—2 of Figure 1.

Figure 3 is a sectional view through the casing.

Figure 5 is an elevation of the casing showing the signaling arm in extended position.

Figure 1:
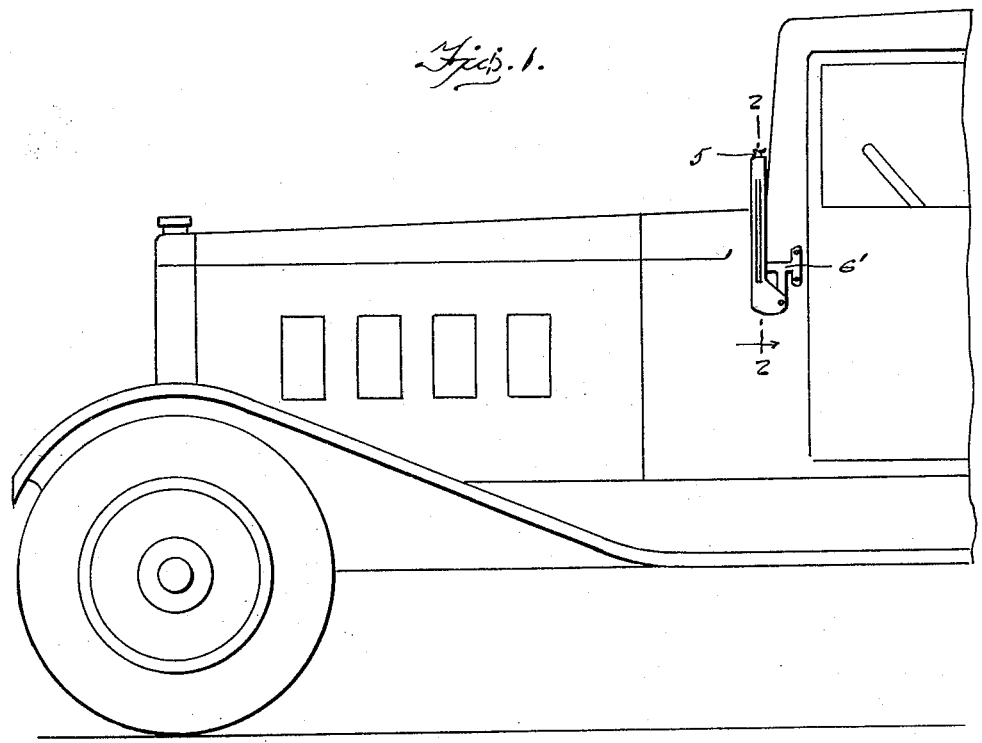
Figure 1 is a fragmentary side elevation showing the front portion of automobile with my signal in place.
Figure 4:
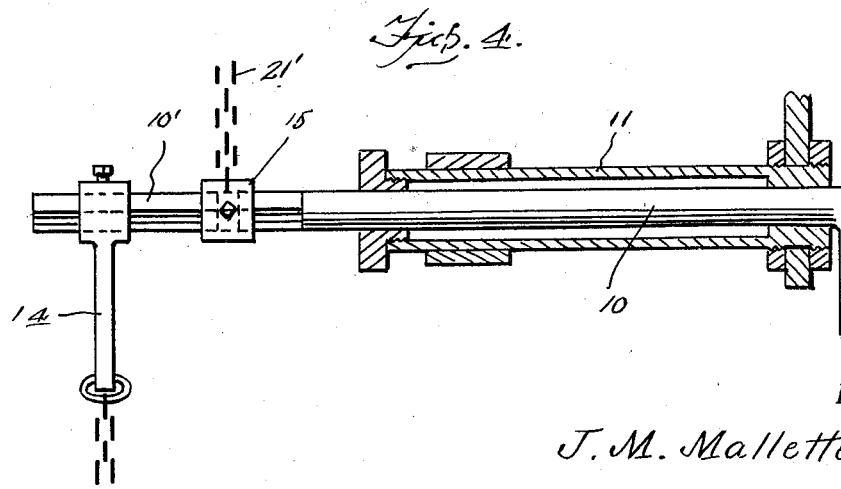
Figure 4 is a longitudinal section through the bearing shaft.

Referring to the drawings in detail it will be seen that numeral 5 denotes a casing, the outer side of which is open. This casing 5 may be mounted by a suitable bracket or the like 6' on the left hand side of the automobile as shown in Figure 1. A signaling arm 6 is rockable on a bolt 7 in the casing 5 to be actuated by a link 8. The link 8 is connected to a crank 9 formed on one end of a shaft 10, rockable in an elongated bearing extending through the side of the automobile and mounted in a suitable bracket 12. The inner end of the shaft is squared as indicated at 10' and on this squared portion is fixed a pair of cranks 14 and 15. A spring 16 is engaged with the crank 15 and with a bracket 17 to normally hold the signaling arm 6 in its housed positions shown in Figure 2. Numeral 18 denotes a brake pedal to which is engaged a chain 19 which also is engaged with a crank 14 so that when the brake pedal 18 is depressed to apply the brake the signaling arm 6 is projected to the lowermost dotted line position shown in Figure 5 to indicate a slowing down of the automobile.

A bracket 20 has mounted therein a pulley 21 over which is trained a chain 21' having one end connected with the crank 15 and its other end carries a ring 21'' and chains 22 and 23 of different lengths are connected to said ring. The chain 23 is engaged with a bell crank lever 24 while the chain 22 is engaged with the bell crank lever 25. The bell crank levers 25 and 24 are rockable on a pin 26 mounted on a plate 27 which is fastened to the steering column 28 so that the bell crank levers may be easily and conveniently manipulated by the driver of the automobile. Abutment set screws 30 and 31 are mounted in a bracket 33 to limit the movements of the bell crank levers 24 and 25. The adjustment of these stop screws and the length of the chains 22 and 23 control the signaling position of the arm 6. Thus when the bell crank lever 24 is pulled the shorter chain 23 causes the signaling arm to take the uppermost dotted line position shown in Figure 5 to indicate a right hand turn whereas when the lever 25 is actuated with its longer chain 22 the signaling arm takes the full line position in Figure 5 indicating a left hand turn.

The top of the casing denoted by the numeral 5' is removable and is held in place by a bolt 35, nut 36 and angle iron 37 as clearly illustrated in Figure 3 of the drawings. Thus this top 5' may be removed so as to permit the easy access to the interior of the casing. A buffer 38 is mounted in the casing with which the signaling arm 6 abuts when it swings inwardly.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a signaling apparatus of the class described, a signaling member, a shaft, means for rockably mounting the shaft, means operatively connecting the shaft with the signaling member so that by rocking the shaft the signaling member may be actuated, a crank on the shaft, a pair of chains of different lengths connected with the crank, and a pair of bell crank levers, one engaged with each chain.

2. In a signaling apparatus of the class described, a signaling member, a shaft, means for rockably mounting the shaft, means operatively connecting the shaft with the signaling member so that by rocking the shaft the signaling member may be actuated, a crank on the shaft, a pair of chains of different lengths connected with the crank, a pair of bell crank levers, one engaged with each chain, a second crank on the shaft, a chain engaged therewith, and a pedal with which the last mentioned chain is engaged.

3. In a signaling apparatus of the class described, a signaling member, a shaft, means for rockably mounting the shaft, means operatively connecting the shaft with the signaling member so that by rocking the shaft the signaling member may be actuated, a crank on the shaft, a pair of chains of different lengths connected with the crank, a pair of bell crank levers, one engaged with each chain, a second crank on the shaft, a chain engaged therewith, and a pedal with which the last mentioned chain is engaged, a casing, and means for mounting the signaling member in the casing.

4. A signaling apparatus of the class described including a casing, a signaling arm swingably mounted in the casing, a link connected thereto, a shaft, a bearing rockably mounting the shaft, a crank formed at one end of the shaft and engaged with the link, a crank on the other end of the shaft, a pair of chains of different lengths connected with the last mentioned crank, a pair of bell crank levers one engaged with each chain, a plate, and means for rockably mounting the bell crank levers on the plate.

5. A signaling apparatus of the class described including a casing, a signaling arm swingably mounted in the casing, a link connected thereto, a shaft, a bearing rockably mounting the shaft, a crank formed at one end of the shaft and engaged with the link, a crank on the other end of the shaft, a pair of chains of different lengths connected with the last mentioned crank, a pair of bell crank levers one engaged with each chain, a plate, means for rockably mounting the bell crank levers on the plate, and a spring engaged with said crank to normally hold the shaft so that the signaling arm is disposed within the casing.

In testimony whereof I affix my signature.

JOSEPH M. MALLETTE.